(12) United States Patent
Brookner

(10) Patent No.: US 7,287,693 B2
(45) Date of Patent: Oct. 30, 2007

(54) PROXIMITY VALIDATION SYSTEM AND METHOD

(75) Inventor: George Brookner, Norwalk, CT (US)

(73) Assignee: Neopost Technologies S.A., Bagneux (FR)

( * ) Notice: Subject to any disclaimer, the term of this patent is extended or adjusted under 35 U.S.C. 154(b) by 0 days.

(21) Appl. No.: 11/498,855

(22) Filed: Aug. 4, 2006

(65) Prior Publication Data

US 2007/0023508 A1 Feb. 1, 2007

Related U.S. Application Data

(63) Continuation of application No. 11/047,534, filed on Jan. 31, 2005, now Pat. No. 7,108,177.

(51) Int. Cl.
*G06K 5/00* (2006.01)
*G06F 17/00* (2006.01)

(52) U.S. Cl. ............... 235/382; 235/375; 235/380

(58) Field of Classification Search ............ 235/375, 235/380, 382, 439

See application file for complete search history.

(56) References Cited

U.S. PATENT DOCUMENTS

| 6,624,739 B1 * | 9/2003 | Stobbe ............... 340/5.2 |
| 6,695,207 B1 * | 2/2004 | Norris, Jr. ............. 235/382 |
| 2004/0256456 A1 | 12/2004 | Coughlin et al. |
| 2005/0036620 A1 | 2/2005 | Casden et al. |
| 2006/0107061 A1 * | 5/2006 | Holovacs ............ 713/182 |

* cited by examiner

*Primary Examiner*—Thien M. Le
*Assistant Examiner*—April Taylor
(74) *Attorney, Agent, or Firm*—Kenyon & Kenyon LLP

(57) ABSTRACT

A gate keeping system for a user accessible resource is provided. The system has a server, a transceiver and an RFID tag. The server is communicably connected to the resource for sending commands allowing and terminating user access to the resource. The receiver is communicably connected to the server and capable of sending an RF interrogation signal. The RFID tag is capable of sending an RF signal in response to the receiving the interrogation signal. The RFID tag has a program that embodies user unique credentials capable of providing user access to the resource. The user unique credentials represent a user associated with the tag.

11 Claims, 6 Drawing Sheets

PROXIMITY VALIDATION SYSTEM AND METHOD

This is a continuation of application Ser. No. 11/047,534 filed 31 Jan. 2005, now U.S. Pat. No. 7,108,177 the content of which is incorporated herein by reference.

BACKGROUND

1. Field of the Invention

The present invention relates to a secure system for automatically interfacing a user with a resource.

2. Brief Description of Related Developments

In the security conscious environment, present today and probably for the foreseeable future, in which security concerns permeate through almost every aspect of daily living, there is a great desire to secure access to resource systems whether they be material such as, private homes, commercial and public facilities, transportation and shipping systems, or electronic such as computers/processing devices or computer controlled systems and networks. A common thread in effecting secure access to the diverse. resource systems is providing a secure way of establishing user identity. However, conventional systems for securely establishing user identity are slow complex and inefficient. For example, in the case of securing access to computer controlled systems. Conventional security methodologies in use today have a user of the computer controlled systems enter an identification and password into the system in order to have access to that system's capabilities. Throughout all industry the precursor for access to computers and networks is proof of authenticity of the individual requesting access to the system. Such proof of authenticity with conventional systems requires the user to input some means of identification. Conventionally such identification is log-on identification followed by a unique password. Other conventional methods for identification include the use of "Smart Cards" to replace the manual entry of the "log on" information, biometric information of passwords, and various combinations of identification mechanisms to assure the individual requesting access to the system is who he says he is.

As noted before, these conventional systems and methodologies for securing access, are slow (e.g. manual entry or authentication information), inefficient (e.g. accessing "smart card" which is then subsequently "swiped" or read by scanning means that by the very nature of the scanning/reading are susceptible to reading errors from dirt and other matter capable of causing reading errors) and costly (e.g. biometric information systems). The present invention overcomes the problem of conventional systems as will be described in greater detail below.

SUMMARY OF THE EXEMPLARY EMBODIMENTS

In accordance with one exemplary embodiment of the present invention a gate keeping system for a user accessible resource is provided. The system comprises a server, a transceiver and an RFID tag. The server is communicably connected to the resource for sending commands allowing and terminating user access to the resource. The transceiver is communicably connected to the server and capable of sending an RF interrogation signal. The RFID tag is capable of sending an RF signal in response to the receiving the interrogation signal. The RFID tag has a program that embodies user unique credentials capable of providing user access to the resource. The user unique credentials represent a user associated with the tag.

In another exemplary embodiment the RF signal from the RFID tag includes data related to the user unique credentials. The RF signal from the RFID tag includes encrypted data. The RF signal from the RFID tag has authenticated data.

BRIEF DESCRIPTION OF THE DRAWINGS

The foregoing aspects and other features of the present invention are explained in the following description, taken in connection with the accompanying, drawings, wherein.

DETAILED DESCRIPTION OF THE EXEMPLARY EMBODIMENT(s)

Figure 1:
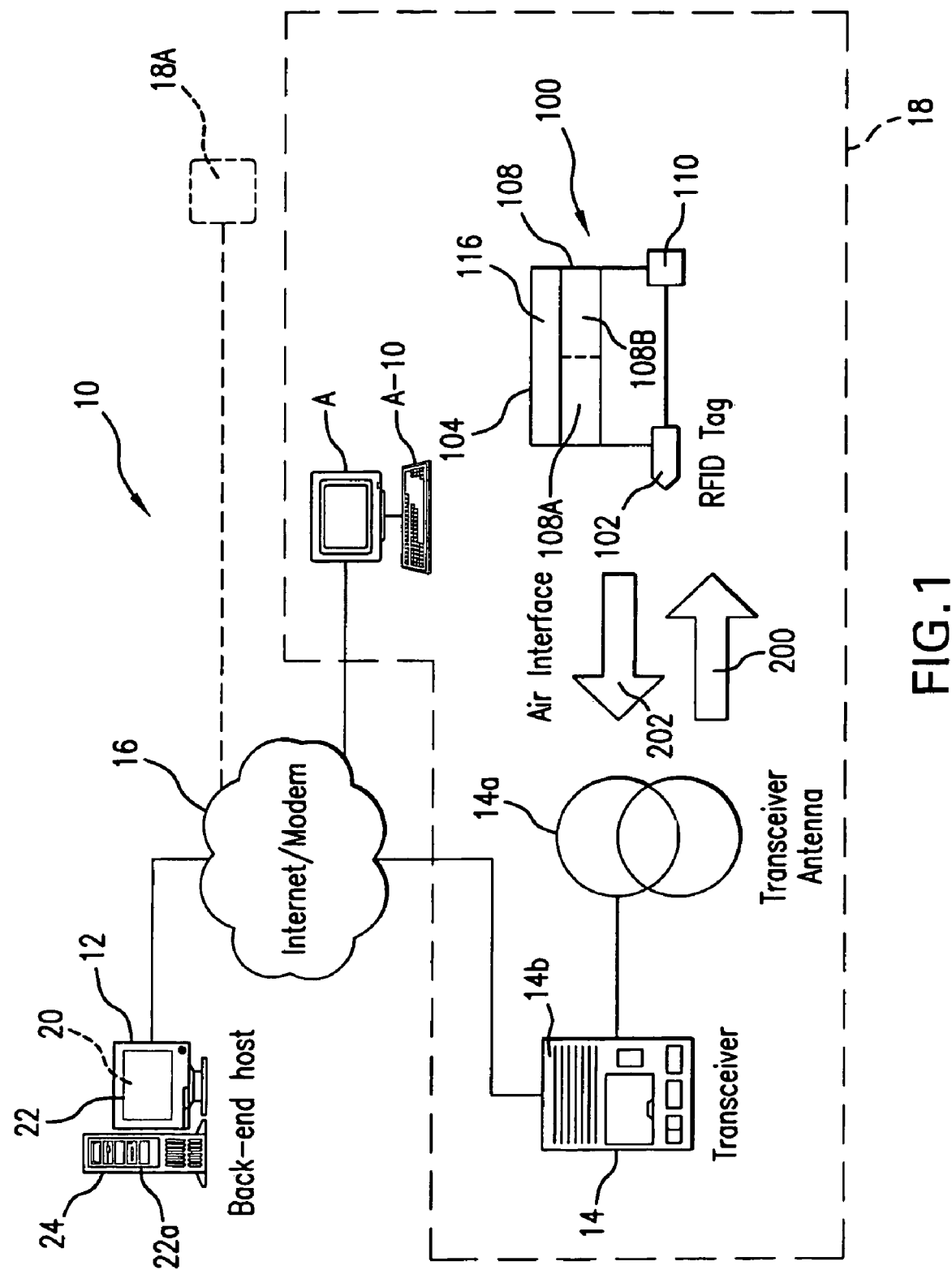
FIG. 1 is a schematic diagram of a system incorporating features in accordance with an exemplary embodiment of the present invention.

As seen in FIG. 1, the user identification system 10 secures access to a resource system of drive A. In this embodiment, the resource A, which is secured and to which a user seeks access is schematically represented as a computer terminal or work station A10. The work terminal A10 is a representative station, and is shown as a single station for example purposes only. Station A10 may be a stand alone PC connected to the user identification system as will be described below, or may be any desired number of terminals or devices connected to the system 10. Further, resource A may be communicably connected to other devices/terminals either by a LAN or other desired network (not shown) so that access to resource A serves as a portal to the other devices communicating with resource A, but not independently secured by system 10. In alternate embodiments, resource A may be any other desired system or device to which access is secured by system 10, such as private, commercial or public facility, conveyances and facilities transportation and shipping systems, or any other suitable system to which secure access is desired. In still other alternate embodiments the system 10 may secure any desired number of individual resources which may be of the same or of different types.

Still referring to FIG. 1,. the user identification system 10 employs RFID technology to effect an automatic and secure way of providing user identity to terminal A when the, user is in a predetermined proximity to the terminal. The user identification system 10 generally comprises a host server 12 and transceiver 14 for communicating with an RFID tag 100 in the possession of the user. In the embodiment shown in FIG. 1, a representative host. server 12, transceiver 14 and RFID tag 100 are shown for example purposes, and system 10 may comprise any desired number of host processors, transceivers and RFID tags. In general, the RFID tag 100 holds user unique data or user credential (i.e. capable of establishing the identity of the user tag holder) that are communicated via transceiver 14 to the host processor 12 automatically upon arrival of the user within predetermined distance of terminal or station A. The host servers 12 determines the identity and hence access authorization of the tag holder from the user credentials, and automatically enables access. (i.e. "logs on" the tag holder) into terminal A. Departure of the user (and hence the RFID tag) from the proximity of the terminal A, is automatically signaled via transceiver 14 to host server 12 which automatically initiates access termination (i.e. "log off") to terminal A. Hence, system 10 performs user identification and access initiation/termination ("log on/log off") invisibly with respect to the tag holder.

Host server 12 may be any suitable computer station. Shown representatively in FIG. 1 as a single station, host server 12 may comprise any desired number of process stations. Host server 12 may be part of terminal A. Transceiver 14 may also be part of terminal A if desired. The multiprocess stations of host server 12 may be communicably connected by any suitable communication linking means such as a LAN, Internet or wireless communication links. As seen in FIG. 1, the host 2 server 12 may include a suitable processor 20 and memory 22 with programming for operating system 10. Memory 22 may include memory registers capable of storing a database 22a containing electronic data embodying the unique user credentials used in establishing the user identity. The user credentials, which as noted before are unique for each user, may be of any suitable kind, such as a character string, and may be arranged in any suitable manner to serve user identification with the desired level of security. For example, the user credentials may be structured in a manner somewhat similar to the "log-on" identifiers and "password" form of conventional log on systems. In this case each RFID Tag (to be described in greater detail below) may have a unique tag identifier (relating the tag among a population of tags as well as to a particular user) and predetermined user unique identification data. The unique tag identifier also aids authentication as will be seen below. The predetermined user unique identification data may be any desirable electronically communicable data assigned uniquely to a user. The predetermined tag unique identification data may also be any desirable electronically communicable data assigned uniquely to the tag. As will be described further below, the tag identifier and user identifier may be established at any desired time such as at the time the. RFID tag is assigned to the user. The unique tag identifier and unique user identifier may serve as the unique user credentials. In alternate embodiments, the user unique credentials may have any other suitable: form. The database 22a in the memory registers 22 of host server may have any suitable architecture arranged to be interfaced with or accessed by any. desirable access protocol. For example, the database 22a may be arranged generally in accordance with the lightweight directory access protocol ([DAP). Though in alternate embodiments the database may be structured in accordance with any other suitable arrangement and access protocol.

In the embodiment where database 22a has a general [DAP arrangement, the database may have a hierarchical type data store distribution. By way of example, each of the resources (similar to resource A) served by the host server 12 may have a segregated and independently addressed storage location holding data stores with user identification information for that user credentials storage location resource. Thus, the data stores with for resource A may be located in a having an address or identifier associated with resource A. Further organizational distribution may be provided (such as at a sub-resource or sub-location level if desired). In this embodiment, user credential data may be held in a separate data store of a corresponding location. This allows the database 22a in host server 12 to efficiently store user identification information related to any desired number of different resources (similar to resource A) and facilitate ready access to any desired data stores related to a desired resource.

As may be realized, the address. information assigned to each data store in database, and enabling the interface program in host server 12 to access the data stores, reflects the distribution/architecture of the database. As seen in FIG. 1, the host server 12 may have a software suite 24 for interfacing with and accessing/reading information stored in data stores of database 22a. Software suite 24 may also be capable of writing or storing data into data stores of the database, and if desired of designating memory space in memory 22 as data stores for database 22a. Further, software suite 24 may include suitable communication software to interface with and operate transceivers (similar to transceiver 14) for effecting bidirectional communications with RFID tags such as tag 100. Further still, software suite 24 is capable of communicating with the resources it serves, such as resource A, to enable user access/"log on" (i.e. to provide the resource user with the roles and privileges associated with log on) to the resources, and to remove access/"log off" the user as will be described further below.

Still referring to FIG. 1, there is shown an operation area 18 including a station A10 of resource A, and transceiver 14. Area 18 schematically represents the geographic region where a RFID tag 100 held by user desiring access to resource A is capable of communicating with transceiver 14. The boundaries of area 18 may be established as desired, and the communication range of the transceiver 14 may be set accordingly. By way of example, the operation area 18 may be established to be within the immediate proximity (about 2-3 ft) of the station A10. The location, relative to station A10, and communication range of the transceiver 14 are thus appropriately defined. Log on and log off of a user onto resource station A10, as will be described in greater detail below, occurs respectively when the RFID tag 100 held by the user (and with the appropriate user credentials thereon) is correspondingly brought into or removed from the aforementioned proximate boundaries of the operation area 18. An operation area of this size may be used for example in cases where it is expected or desired to provide access to the resource station A10 one user at a time. The proximity of the boundaries of area 18 to the resource station A10, serve in this example to restrict more than one user from being in the operation area. In alternate embodiments, the size or bounds of the operation area may be established as large as desired, and may be capable of encompassing any desired number of users. In other alternate embodiments, the operation area 18 may include more than one station (similar to station A10) for more than one resource (similar to resource A), and may also include more than one transceiver (similar to transceiver 14). For example, the operation area may be a room (not shown) in a facility (or possibly the entire facility or any portion thereof) holding multiple stations (similar to station A10) of multiple resources. Multiple users may be located in the operation area, and some users may be entitled to access some but not all the resource stations in the operation area. As seen in FIG. 1, host server 12 may be connected to serve any desired number of other operation areas 18A (only one is shown for example purposes) that are similar to area 18. As may be realized, resource A may have secured stations (similar to station A10) in the other operation areas 18A served by server 12 of system 10. In this embodiment, the resource station A10, in area 18, and other resource stations (similar to station A10) in other areas 18A may be provided with an identifier related to the area 18, 18A in which the station is situated. Hence, multiple resource stations sharing an operation area may have a common identifier. The identifier, which maybe communicated to server 12 upon connection to a given resource station, may be used to independently address desired resource stations in desired operation areas 18, 18A. Each of the operation areas 18, 18A may be connected to the server 12 via a communication system 16 such as the internet or modems.

As noted before, each operation area 18, 18A of system 10 has a transceiver, similar to transceiver 14. The transceiver generally comprises suitable circuitry (not shown) and an antenna 14a capable of bi-directional communication or coupling, according to a desired communication protocol, with RFID tag 100 when the tag is within the operation area 18, 18A. As may be realized, the transceiver 14 is also capable of converting the response signal from the RFID tag to suitable electronic format for communication to server 12. As noted before, the communication range of the transceiver 14 is established to define the desired size of the operation area 18, 18A. Transceiver 14 may be capable of coupling with one or more of the RFID tags 100 in the operation area 18, 18A. To facilitate coupling with multiple RFID tags (similar to tag 100), the transceiver 14, and/or the server 12 controlling operation of the transceiver, may include a multiple RFID anti-collision interrogation system (not shown) suitable example of which is disclosed in U.S. patent application Ser. No. 10/740,983, filed Dec. 19, 2003, and incorporated by reference herein in its entirety. In this embodiment, the transceiver may be provided with an identifier 14b that for example, may be stored in a suitable memory (not shown) of the transceiver. The transceiver identifier 14b, similar to the resource station identifier disclosed before, relates the transceiver 14 to the operation area 18 in which the transceiver is operating. The transceiver identifier 14b may be stored or otherwise entered at any desired time such as at system setup or upon connection of the transceiver to the server. The transceiver identifier 14b, may be communicated at any desired time, such as when communicating the response signal received from the RFID tag, to the server. Hence, the transceiver identifier 14b may be used by the server 12 to associate the particular transceiver 14 to the corresponding resource station A10, and the RFID tag(s) 100 (and thus the users) communicating with the given transceiver with the corresponding resource station A10. This allows the server 12, upon verification of the user credentials from the RFID communication received via transceiver 14, selectively send a command to the corresponding to resource station A10 to enable user access/log on. Conversely, upon receipt of a suitable signal from the transceiver 14 that the RFID tag is no longer present in the operating area 18, the server 12 may selectively transmit a command to the corresponding resource station A10 to log off/close access to the departed user. In this manner, server 12 selectively controls access to desired stations of a given resource without providing access to resource stations where access is not desired.

FIG. 1 shows an RFID tag 100 used for access to the resource stations A10 of resource A. Tag 100 shown in FIG. 1 is a representative tag, and any number of tags similar to RFID tag 100, each as noted before with unique user credentials, may be issued or otherwise available for use to log on/log off stations of resource A. In this embodiment, RFID tag 100 may be specifically related to resource A (i.e. tag 100 serves to provide access specifically to resource A). RFID tag 100 may also be specifically related to other resources (not shown) having stations located in common with resource station A10 in operation area 18, or independently located. As seen in FIG. 1, tag 100 has suitable RFID circuitry 102 to receive RF interrogation communication 200 from transceiver 14 and transmit a suitable RF response communication 202 to the transceiver. In the exemplary embodiment, the RFID circuitry 102 may be "active" (i.e. capable of actively generating the RF response communication 202, rather than modulating the reflected interrogation signal). Accordingly, tag 100 may include a battery 110 or other suitable power supply (e.g. protocol) connected and supplying power to the RFID circuitry 102. In alternate embodiments the RFID circuitry of the tag may be "passive" or "active/passive". Tag 100 also has suitable memory 104, such as ROM or EPROM memory, with registers 108 for storing for example the unique tag identification data 108a, and unique user identification data 108b. Memory 104 in this embodiment includes suitable encryption programming 106 to provide secure communication to transceiver 14/server 12. The software suite 24 of the server 12 has suitable decryption capable of reading the data in the encrypted communication from the RFID tag.

The communication between RFID tag 100 and server 12 may be secured by public/private key cryptography. By way of example, the tag memory 104 may have stored therein a tag private key. Further, to facilitate an authentication function of the tag 100, memory 104 of the tag 100 in this embodiment may hold a tag provider or tag vendor private key. As may be realized, tags similar to tag 100 are issued or provided to users of resource A by one or more providers. The tag provider has a private key that is registered in the tag memory 104 at any time before or during issue of the tag to the user. The tag provider also has a public key that is stored in the memory of 22 of server 12. The tag private key, is unique to the tag 100 and hence may form part of the unique tag identifier of the tag 100. The matching tag public key to the tag private key is also stored in the memory 22 of server 12. The tag private key may also be registered in tag memory 104 at any time before or during issue of the tag to the user. User unique identification data 108b may be registered in the tag memory 104 when the tag provider issues the tag 100 to the user. As noted before, the user unique identification data are also provided by any suitable secure means to the server 12 and are stored in the suitable data store for the appropriate resource in database 22a.

Figure 2:
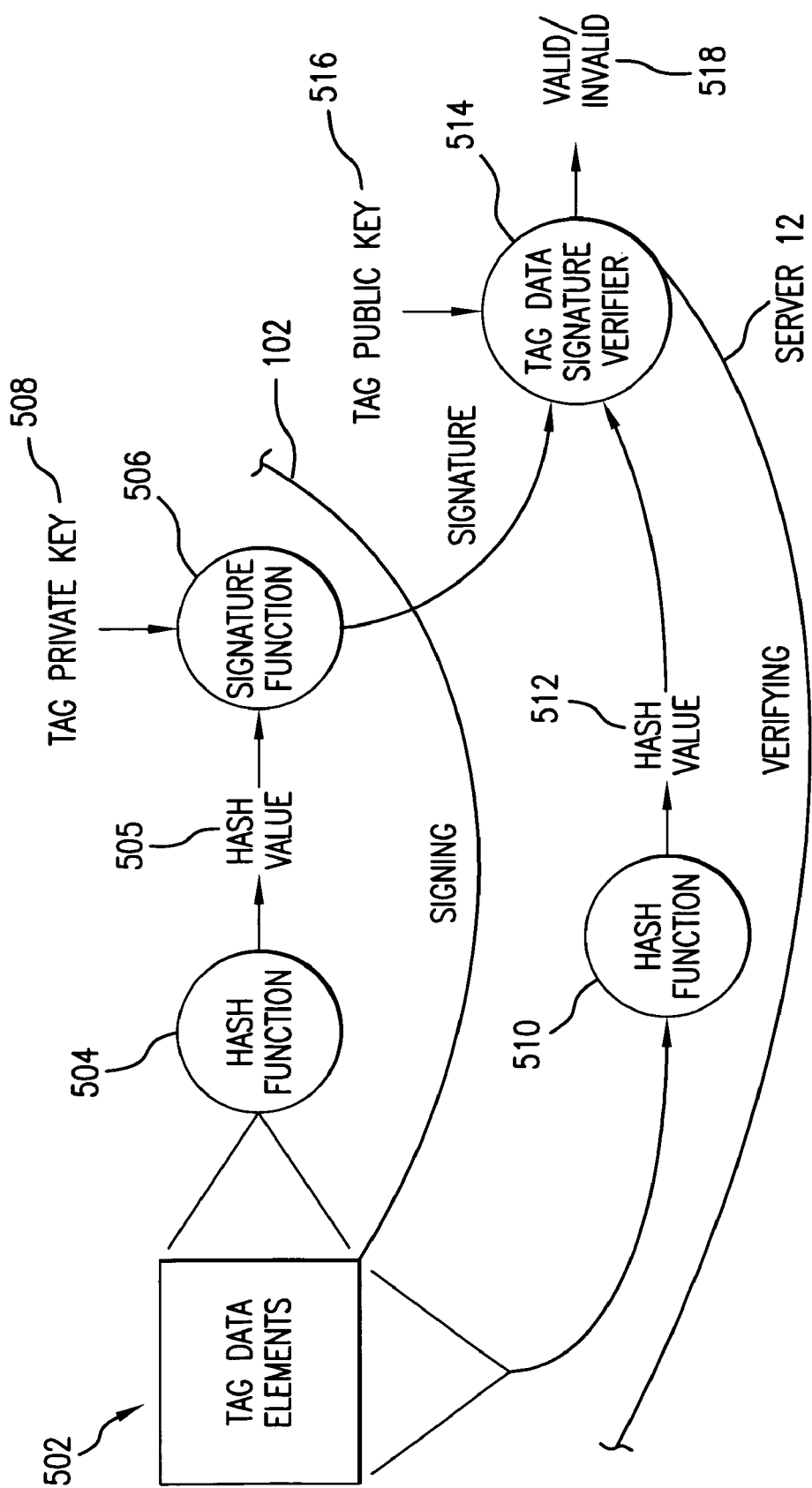
FIG. 2 illustrates one embodiment of a digital verification process of a RFID tag with a remote reader/transceiver of the system in FIG. 1.
Figure 3:
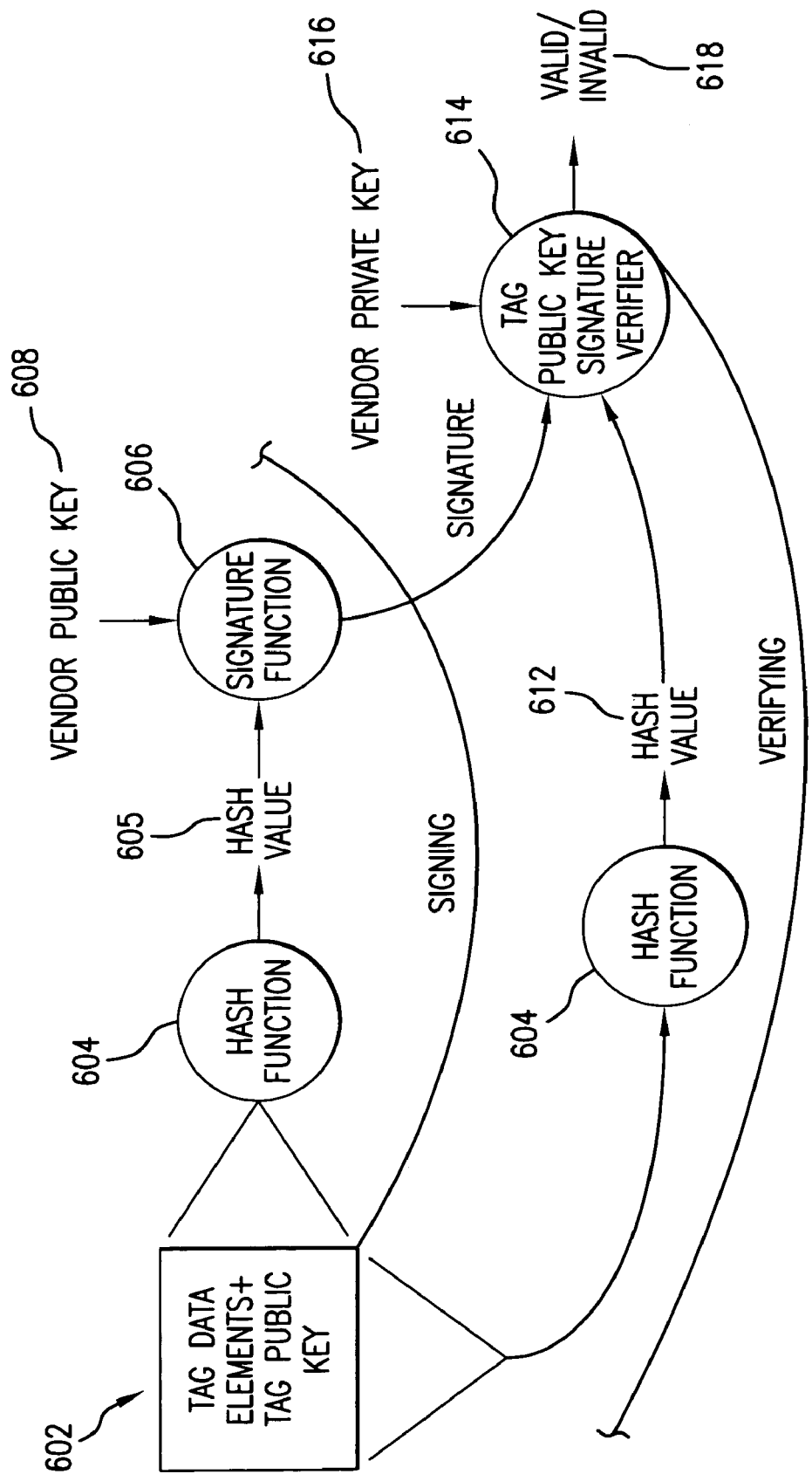
FIG. 3 represents one embodiment of a RFID tag public key validation process.

The tag 100 may use the tag private key to sign data transmitted in the response 202 to the interrogation command 201 from transceiver 14. FIG. 2 illustrates one embodiment of a validation process for data signatures of RFID tag 100. The tag data elements, such as for example tag identification data 108a (see also FIG. 1) 502 are applied to a hash function 504 to result in a hash value 505. Hash function 504 may be stored in RFID tag memory 104. The hash value 505 and the tag private key 508 (from memory 106) are combined to produce the signature function 506. Signature function 506 is transmitted to transceiver 14 in communication response 702 along with tag data elements 502. During verification performed by the server 12, the hash value 512, produced from the hash function 510 as applied to the tag data elements 502, is inputted to the tag data signature verifier 514, of the server 12 together with the received signature and the tag public key 516 from server memory. The result 518 determines the validity or invalidity of the tag data elements 502 after transmission. Authentication of the tag 100 is schematically illustrated in FIG. 3. In this embodiment, the tag data elements in the tag response transmission 202, and the tag public key 602 are hashed via a hash function 604 to produce a hash value 605. The hash value 605 and vendor public key 608 are used to produce the signature function 606 transmitted to the server via transceiver 14. The vendor private key 616 from the server memory is used together with the received signature function key 606 and hash value 612 in the tag public key signature verifier 614 to determine if the tag data elements are associated with the proper authority and are determined to be valid or invalid 618. Authentication of the tag and validation of the RFID tag data as described above assures that the message incorporated in the communication from the tag 100 is as transmitted from the tag 100. The response communication 202 may also contain the user unique identification data encrypted utilizing standard public key encryption techniques. The user identification data is related to the server 12, upon receipt by the transceiver 14, and decrypted by the server. The response communication may further contain data identifying the resource A to which tag 100 is related as noted above. This data may serve or be formatted to provide the directory, and/or subdirectory, address in server database 22a holding the data store with the user identification credentials for tag 100. After reception of the user credentials transmitted by tag 100, server 12 performs a comparison of the received user credentials with corresponding stored user credentials from the database. Upon finding a match between received and stored user credentials, server 12 as noted before sends a writable enable access command to the resource station A10 in the appropriate operation area 18, thereby effecting user "log on" the resource station. The server 12 may also inform the resource A or resource station of the identity of the user being logged on by for example sending the resource station A10 a data entry (e.g. password) enabling the resource A to identify the user/tag holder.

Figure 4:
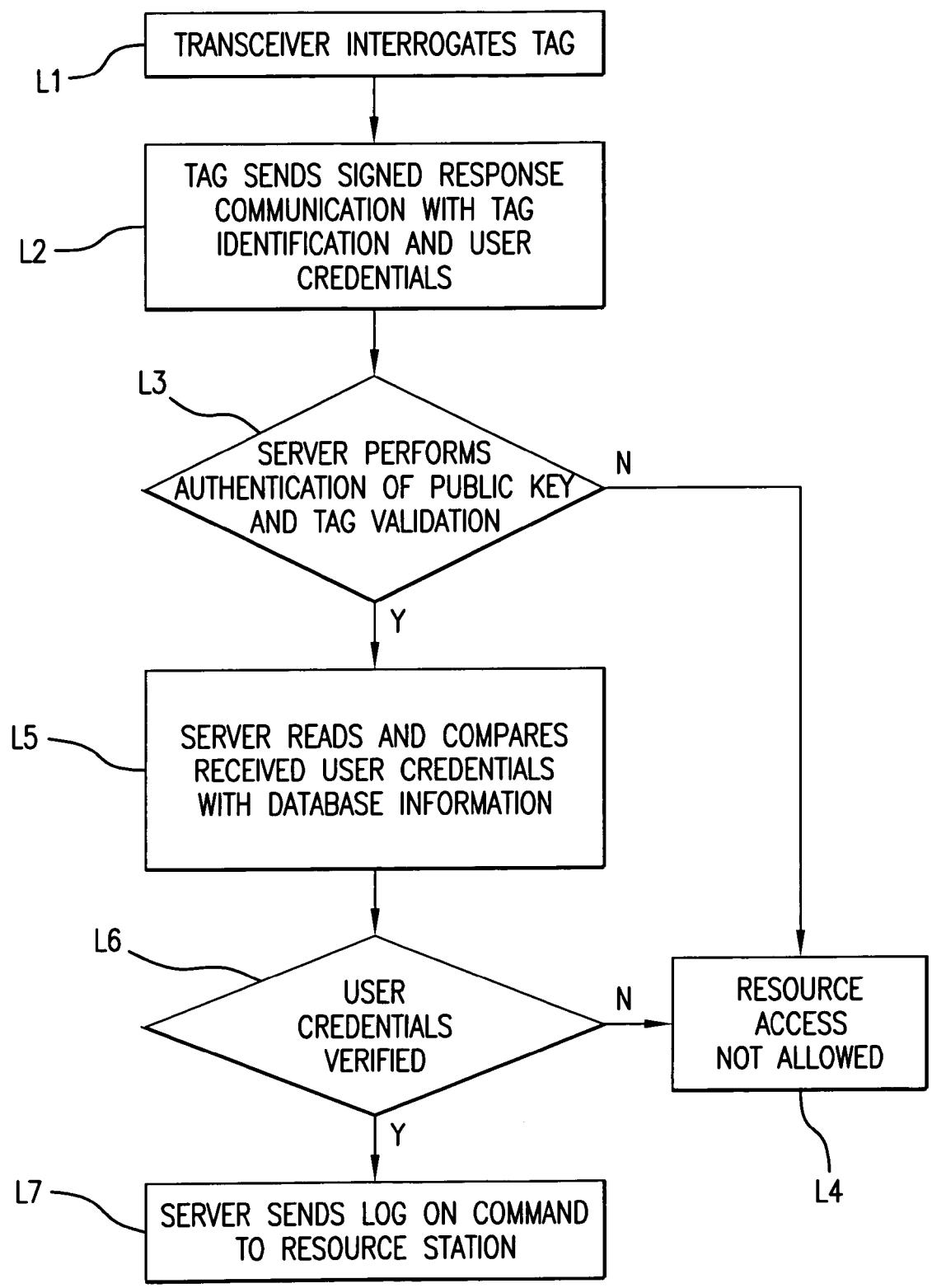
FIG. 4 is a flow chart schematically illustrating a method of operation of the system.

FIG. 4, schematically illustrates a suitable process for effecting automatic "log on" of a user onto resource station A10. As seen in FIG. 1, the "log on" may automatically commence when the user in possession of RFID tag 100 (as will be described below) enters the operation area 18. Transceiver 14 may be capable of sensing when the RFID tag 100 becomes present inside the operation area. For example, the RFID tag may send a suitable locator signal periodically that, upon receipt by the transceiver, informs the transceiver/server of the presence of the RFID tag. The periodicity of the locator signal transmission from tag 100 may be sufficient so that the transceiver 14 receives a locator signal from the tag immediately upon entering the operation area 18. In alternate embodiments, the locator signal may be transmitted substantially continuously. As may be realized, locator signal range may be established so that the transceiver 14 will not receive tag locator signals when the tag 100 is located outside the operation area 18. In alternate embodiments the transceiver 14 may send the interrogation signal (similar to interrogation signal 200), continuously or with sufficient periodicity so that the RFID tag may be interrogated within a substantially imperceptible short duration after entrance into the operation area. In this case, reception of the response communication (similar to communication 202 in FIG. 1) from the RFID tag would inform the transceiver/server of the presence of the tag in the operation area. Thus, the log-on process commences automatically with the transceiver 14 transmitting the interrogation signal as illustrated in block L1 of FIG. 4. In response to the transceiver interrogation, in block L2 the RFID tag 100 sends a signed response communication 202 transmitting the encrypted unique tag identifier and user credentials from the tag memory as described before. The response communication received by the transceiver 14, is related to the server 12 for authentication of the public key and validation of the tag (see block L3 in FIG. 4). If the server determines that the signature is not authentic and/or the tag is invalid, the "log-on" process is stopped and resource access is not allowed, block L4. If in block L3, the server authenticates the public key and validates the tag, the log on process continues as in block LS, with the server reading the user credentials received from the tag and comparing the received credentials with the user credentials in the appropriate directory in database 22a (see also FIG. 1) corresponding to resource A. If the server cannot match the received user credentials with those in the corresponding data store of database 22a, in block L6, the server stops the "log-in" process and access to. the resource A is denied (block L4). If in block L6, the user credentials transmitted by the RFID tag are verified, then in block L7 the server sends a "log-on" command to the desired resource station A10 (identified for example by the transceiver identification) thereby logging on the user. As noted before, the server may also communicate to the resource A, the identity (i.e. data representing the identity) of the user being logged on.

Figure 5:
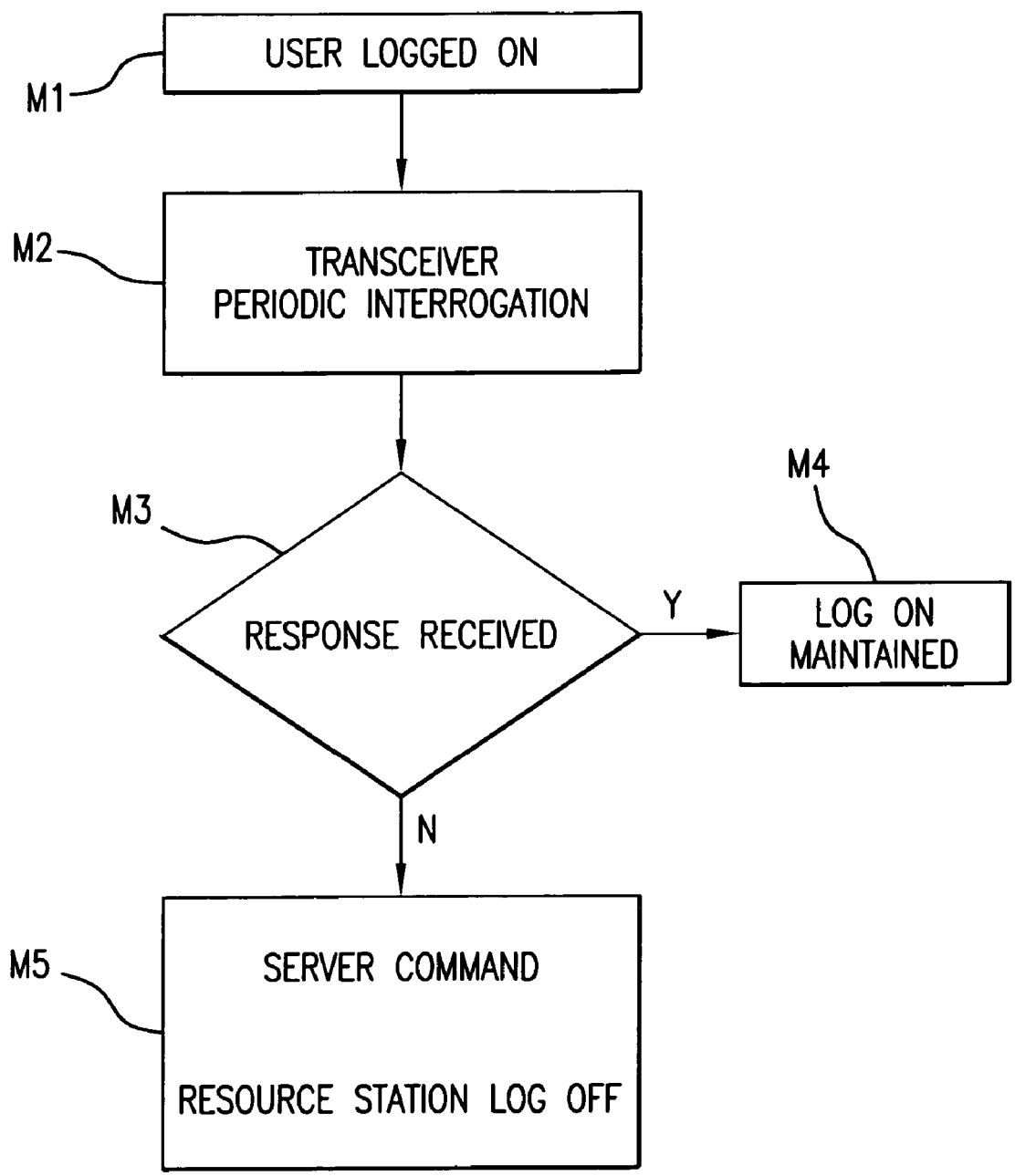
FIG. 5 is a flow chart schematically illustrating another method of operation of the system.

FIG. 5 schematically illustrates the process by which the user, is automatically logged off from the resource station A10. In block M1 of FIG. 5, the user is logged on the resource station A10, for example in the manner described above and illustrated in FIG. 4. Transceiver 14 may be capable of sensing when the RFID tag 100 is no longer located in the operation area 18. For example, as noted before the RFID tag may send a periodic locator signal received by the transceiver 14 when the tag is in the operation area. Removal of the tag from operation area 18 causes the transceiver to stop receiving the periodic locator signal, which may be interpreted by the transceiver 14 to mean that the RFID tag 100 is no longer located in the operation area. In response the receiver 14 may send an interrogation signal to confirm presence or lack thereof. In alternate embodiments, the transceiver may send continuously or periodically an interrogation signal, similar to signal 200 in FIG. 1, to determine the presence of the RFID tag in the operation area. Failure to receive a response from the RFID tag 100 indicates that the tag is no longer present in the operation area. In any event, the "log-off" process is commenced automatically, and may be initiated by the transceiver sending an interrogation signal to confirm the presence or lack thereof of the tag 100 in the operation area, block M2 in FIG. 5. If the transceiver receives a response to the interrogation signal, block M3, then the "log-on" is maintained, block M4. If the transceiver receives no response from the tag in block M3, then the transceiver sends a suitable signal to the server indicating the tag 100 is no longer in the operation area 18. In block M4, the server, upon receiving such signal, may send a command to the appropriate resource station A10 to "log-off" the user.

Figure 6:
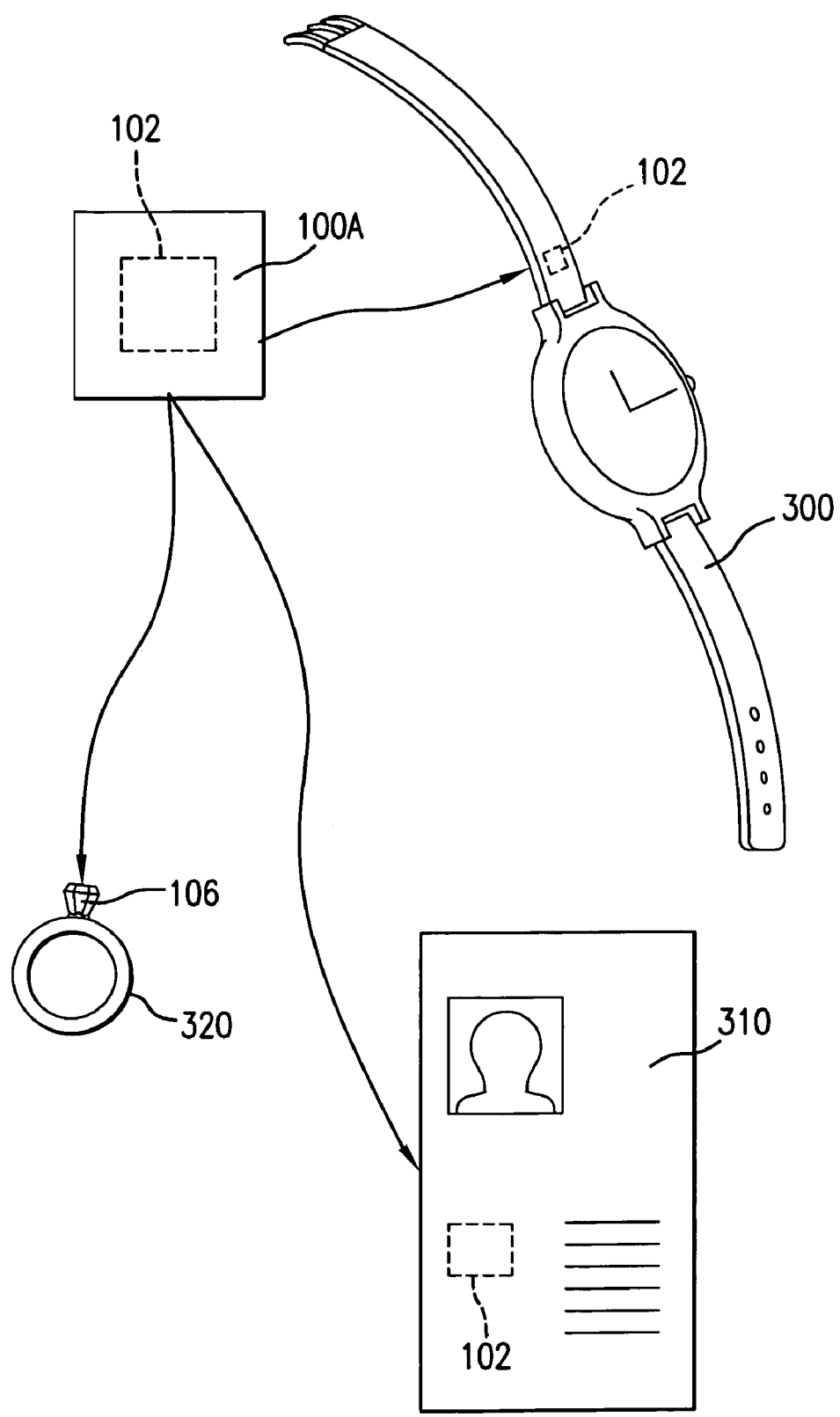
FIG. 6 shows a number of exemplary devices incorporating a RFID tag of the system.

The RFID tag 100 may be incorporated into any desired device or apparatus 300, 310, or 320 (see FIG. 6). By way of example and as shown in FIG. 6, the tag 100 may be included into a wristwatch 300, apparel 320, or card/badge 310. The RFID circuitry (similar to circuitry 102) may be applied to the device 300, 310 or 320 by any suitable means. For example, the RFID circuitry may be formed integral to the device or may be provided on a chip 100A that may be mechanically applied to the device. As may be realized, the devices 300-320 shown in FIG. 6 as having the RFID circuitry and operating as an RFID tag similar to tag 100 are merely exemplary, and in alternate embodiments the RFID tag may be encompassed into any suitable apparatus, device or object.

As described above, system 10 provides automatic log-on and password entry into a resource such as a computer system when a user in possession of the invention's RFID transceiving mechanism is within the proximity of said resource.

The system 10 effects automatically log-out of said user, should said user move outside the proximity boundary of the resource. The system provides users with an RFID tag 100 specifically key coded to said users unique credentials. The RFID transmitter is interfaced to the computing system 10, such that when an individual's RFID transceiver responds to the signal transmitted from the computer RFID transmitter, said individual's RFID (RFID tag) transceiver responds with a signal pattern uniquely describing said individual's unique credentials.

Further, the signal pattern sent from the individual's RFID Tag may be received by the system's transceiver, with said pattern being communicatively sent to the server of the system 10 which digitized said pattern to determine the identity of the user whose RFID tag produced the received pattern, when compared to information within the system 10.

The communications between the RFID tag and system's transmitter/receiver. system may be encrypted and/or signed to provide security against eavesdroppers or third parties intent on compromising the security of the system. In this case, each RFID tag may have injected into it or have an application to generate a public/private key pair. Using Public Key Cryptographic and Diffie-Hellman session establishment methodologies, the RFID tag and associated computer system will be known and authenticated to each other.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for providing secure access to a workstation, comprising:

broadcasting an interrogation signal within a predetermined operation area;

if an RFID tag is within the predetermined operation area, transmitting a response signal from the RFID tag to a transceiver;

forwarding the response signal to a remote server;

comparing user credential data of the response signal to user credential data stored in a database accessed by the remote server;

if the credential data of the response signal matches the stored user credential data, sending a log-on command from the remote server to a workstation located within the predetermined operation area to enable access to the workstation;

wherein transmitting comprises signing the response signal and wherein signing comprises:

generating a hash value from tag identification data using a hash function stored on the RFID tag;

combining the hash value and a tag private key to form a signature function; and transmitting the signature function as part of the response signal.

2. The method of claim 1, wherein forwarding comprises transmitting the response signal over a network.

3. The method of claim 1, further comprising determining if a locator signal is received from the REID tag after sending the log-on command and if not, disabling access to the workstation.

4. The method of claim 3, further comprising broadcasting additional interrogation signals within the predetermined operation space, wherein the RFID tag transmits the locator signal in response if the RFID tag is within the predetermined operation space.

5. The method of claim 4, wherein broadcasting comprises continuously broadcasting the additional interrogation signals.

6. A system for securing access to a workstation, comprising:

a transceiver for broadcasting an interrogation signal within a predetermined operation area;

an RFID tag for transmitting a response signal to the transceiver if the RFID tag is within the predetermined operation area; and a remote server for receiving the response signal from the transceiver, the remote server comparing user credential data of the response signal to user credential data stored in a database, wherein the remote server sends a log-on command to the workstation located within the predetermined operation area to enable access to the workstation if the credential data of the response signal matches the stored user credential data;

wherein the response signal is signed and wherein signing the response signal comprises:

generating a hash value from tag identification data using a hash function stored on the RFID tag;

combining the hash value and a tag private key to form a signature function; and transmitting the signature function as part of the response signal.

7. The system of claim 6, wherein the remote server is connected to the workstation over a network.

8. The system of claim 6, wherein the transceiver broadcasts additional interrogation signals within the predetermined operation space after the remote server sends the log-on command.

9. The system of claim 8, wherein the RFID tag transmits a locator signal in response to the additional interrogation signals if the RFID tag is within the predetermined operation space.

10. The system of claim 9, wherein the remote server disables access to the workstation if the locator signal is not received by the transceiver in response to any additional interrogation signal.

11. The system of claim 8, wherein the remote server continuously broadcasts the additional interrogation signals.

* * * * *